United States Patent [19]
Rengren

[11] 3,867,584
[45] Feb. 18, 1975

[54] DO-NOT-DISTURB ADAPTER FOR TELEPHONE RECEIVERS

[75] Inventor: Wayne E. Rengren, Wood Dale, Ill.

[73] Assignee: GTE Automatic Electric Laboratories, Incorporated, Northlake, Ill.

[22] Filed: July 16, 1973

[21] Appl. No.: 379,280

[52] U.S. Cl. .............................. 179/84 C, 179/2 TC
[51] Int. Cl. .............................................. H04m 1/21
[58] Field of Search... 179/84 C, 84 R, 2 TC, 7.1 R, 179/6.31; 200/35 H, 153 LB, 38 E; 58/152 T

[56] References Cited

UNITED STATES PATENTS 1,831,605 11/1931 Porter .............................. 200/35 H
2,481,840 9/1949 Hardgrave ......................... 179/84 C

*Primary Examiner*—Kathleen H. Claffy
*Assistant Examiner*—Joseph Popek
*Attorney, Agent, or Firm*—James V. Lapacek

[57] ABSTRACT

Apparatus comprising a do-not-disturb adapter for a telephone receiver for selectively blocking incoming ringing signals to the receiver. The apparatus comprises a substantially circular cam having at least one indentation in its peripheral edge which is in physical contact with a switch interposed in the ring control line. A mechanical timer rotates the cam past the switch to open and close the switch.

1 Claim, 4 Drawing Figures

PATENTED FEB 18 1975

3,867,584

DO-NOT-DISTURB ADAPTER FOR TELEPHONE RECEIVERS

BACKGROUND OF THE INVENTION

This invention relates generally to telephone systems and more particularly to a do-not-disturb adapter for telephone receivers enabling a telephone subscriber to block the ringing signals associated with incoming calls.

Reference may be made to the following U.S. Pat. Nos. 3,508,011; 3,226,489; 3,187,108; 3,126,453; 3,033,941; 2,481,840; and 1,932,774.

For any one of a number of reasons, a telephone subscriber may not wish to be disturbed at some particular time. For example, the subscriber may be too busy to carry on a telephone conversation, the subscriber may be asleep, or quite simply, the subscriber may not wish to talk to anyone.

One technique commonly used to insure privacy is to leave the telephone handset off the receiver hook. Leaving the handset off the hook, however, ties up equipment and telephone circuits at the central telephone office, reducing the number of lines available for use by other callers. It also results in equipment at the central telephone office being unnecessarily seized to generate the familiar "howler" signal to alert the subscriber that the handset has inadvertently been left off-hook. While steps such as placing the handset under a pillow may be taken to muffle the "howler" signal, this is not desirable because the subscriber may forget to replace the handset on the receiver.

Accordingly, various and sometimes elaborate arrangements have been developed to screen incoming calls. Typically, such arrangements have included apparatus for returning a distinctive do-not-disturb signal, other than the usual "busy signal" or "dial-tone," indicating that the subscriber does not wish to be disturbed. Generally, however, such arrangements require a power source, and therefore, utilize telephone company power or other commercial power sources. Since such arrangements are commonly designed and installed by non-telephone company personnel, there is a distinct possibility that hazardous voltages will appear on the telephone line.

Moreover, these arrangements have commonly included means for overriding the do-not-disturb signal to allow the caller to determine whether or not he wishes to disturb the subscriber. This, of course, does not protect the subscriber from a caller exercising poor judgment in placing the call over the do-not-disturb signal. Finally, such arrangements usually require additional elaborate and expensive circuitry. For the average telephone subscriber, the added cost makes these arrangements undesirable, and accordingly, the common technique of leaving the receiver handset off the hook continues to be used.

SUMMARY OF THE INVENTION

In accordance with the present invention, a do-not-disturb adapter for telephone receivers is provided for blocking incoming ringing signals to the receiver. In a specific embodiment of the invention apparatus is provided for selectively disconnecting the ring control line to the receiver. The apparatus comprises a switch interposed in the ring control line which is selectively opened and closed by a rotatable cam. The cam has a substantially circular peripheral edge which is in physical contact with the switch, the peripheral edge having at least one indentation therein. A mechanical timer is provided for rotating the cam at a predetermined rate for a selectable time interval, the cam opening and closing the switch as the peripheral edge moves past the switch.

BRIEF DESCRIPTION OF THE DRAWINGS

The features of this invention which are believed to be novel are set forth with particularity in the appended claims. The invention, together with its further objects and advantages thereof, may be best understood, however, by reference to the following description taken in conjunction with the accompanying drawings, in which like reference numerals identify like elements in the several figures and in which:

DETAILED DESCRIPTION

Figure 1:
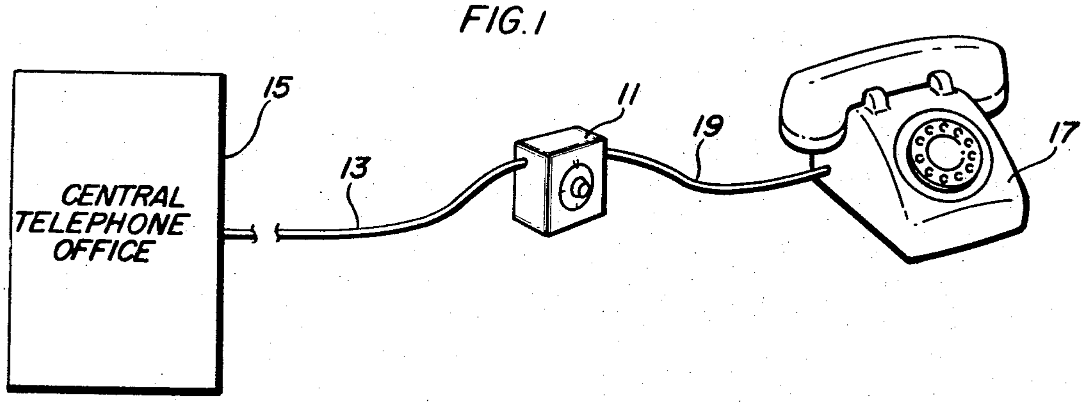
FIG. 1 shows the do-not-disturb adapter of the present invention as it appears when installed in the subscriber's home, office or place of business.
Figures 2, 4:
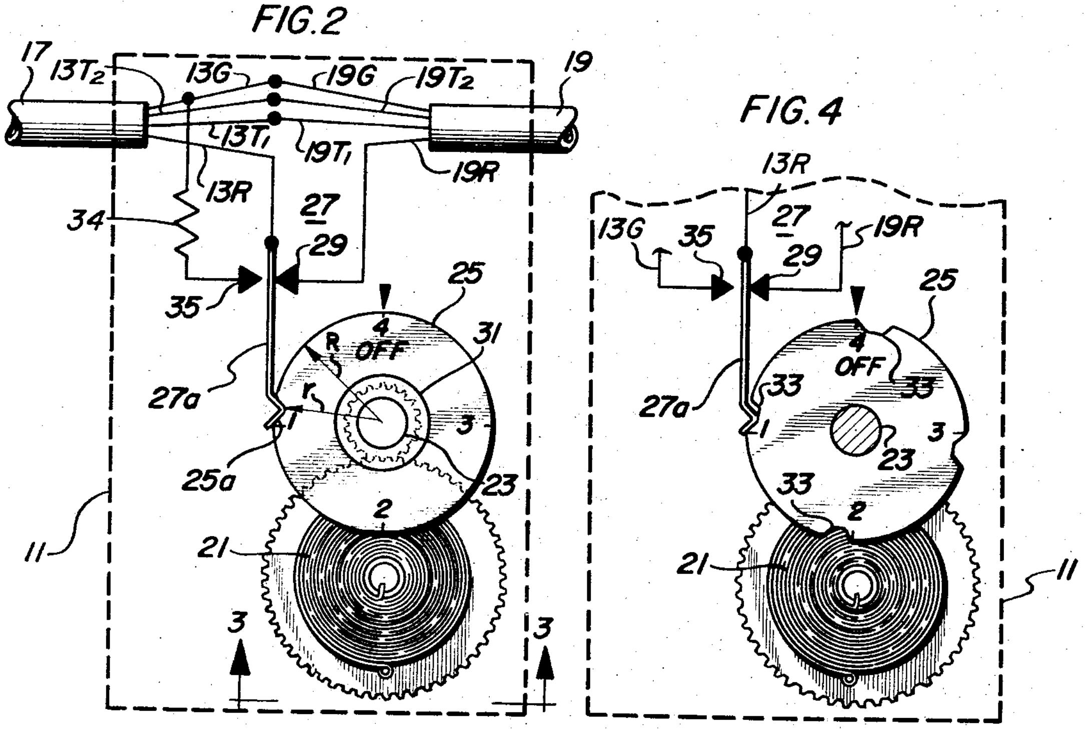
FIG. 2 is a schematic diagram of a do-not-disturb adapter in accordance with the principles of the present invention.
FIG. 4 illustrates a particular cam which may be utilized in conjunction with the timing mechanism of FIG. 3.

Referring now to FIGS. 1 and 2, there is hereinafter described a do-not-disturb adapter for selectively disabling the ringer of a telephone receiver. More particularly, when a caller dials the particular telephone number associated with the telephone receiver of the recipient subscriber, the call is channeled through central telephone office equipment and ultimately transmitted over telephone cable to the subscriber's receiver. Thus, to selectively disable the subscriber's telephone ringer in accordance with the principles of the present invention, a do-not-disturb adapter 11 is interposed in the existing telephone cable 13 between the central telephone office equipment 15 and the subscriber's telephone receiver 17.

The telephone cable 13 connecting the central office equipment and the telephone receiver 17 commonly comprises four separate wires incorporated into a single insulated cable. Two of the wires are transmission lines, 13T, and $13T_2$, used to transmit voice communications between the caller and the telephone subscriber. A third wire, 13G, serves as a grounding wire between the telephone receiver 17 and the central telephone office equipment 15. The fourth wire included in cable 13 is the ring control line 13R which conducts a periodic signal to the subscriber's receiver 17 after the call has been placed until the handset **17*a* is removed from the receiver 17**. The periodic ring control signal, as is commonly known, enables a bell or other indicator device to alert the subscriber to a call being placed to his particular telephone receiver.

In the particular embodiment shown in FIGS. 1 and 2, the cable 13 is disconnected at the receiver 17 and, in turn, connected to the do-not-disturb adapter 11. A cable 19 from the adapter 11 is then connected to the vacant terminals in the receiver 17. In particular, the adapter cable 19 also comprises four wires: two transmission lines, $19T_1$ and $19T_2$; a ground wire, 19G; and a ring control line, 19R. Accordingly, the corresponding transmission lines, $13T_1$ and $19T_1$ are connected in the adapter 11 to provide a directly-connected transmission line ($T_1$) between the central telephone office 15 and the receiver 17 while lines 13$T_2$ and 19$T_2$ are connected to complete the second transmission line ($T_2$). Similarly, the ground wire 13G is connected to a corresponding ground wire 19G in the adapter 11.

The ring control wire 13R, however, is not directly connected to the corresponding ring control wire 19R of the adapter cable 19. Rather, a mechanical switching apparatus interposed between the two wires, 13R and 19R, may be selectively opened or closed to pass the periodic ring control signals from the central telephone office to the subscriber's receiver.

Figure 3:
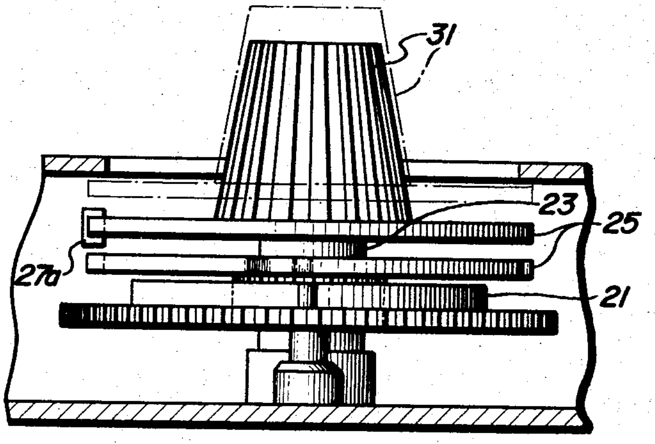
FIG. 3 is a sectional view of the cam and timing mechanism of the do-not-disturb adapter.

With reference to FIGS. 2 and 3, the mechanical switching apparatus of the present invention includes a mechanical timer mechanism comprising a wound ribbon spring 21 for driving a rotatable shaft 23 at a predetermined rate as the spring 21 unwinds. In particular, the timer 21 may closely resemble a common egg timer.

One or more cams 25 having indentations 25*a* therein are mounted on the shaft 23 to periodically open and the switching element 27*a* close a mechanical switch, identified generally at 27, associated with the switching apparatus. That is, if the switch element 27*a* is in contact with the cam 25 at a point where the radius of the cam is maximum, i.e., at R, electrical connection between ring control wire 13R and the adapter ring control wire 19R at contact 29 is broken. Similarly, at the indentation 25*a*, where the radius of the cam 25 is minimum, i.e., the connection at contact 29 is made. Accordingly, the cam shown in FIG. 2 breaks the connection at contact 29 at all settings of the knob 31 on the adapter unit 11 (FIG. 1) except the OFF position. That is, as the spring 21 unwinds, the knob 31 and the cam 25 rotate with the shaft 23 until the timer reaches the indentation 25*a* at its OFF position. There, the radius of cam 25 decrease to "*r*", and the connection at contact 29 is made. For example, if the subscriber turns the knob 31 until the numeral "2" is adjacent to the indicator mark on the adapter case, the ring control line will be disconnected for a period of 2 hours. During such intervals, any ring control signal transmitted to the subscriber's telephone receiver will be blocked from the ringer or other alarm device of the receiver by the adapter 11.

As is more clearly shown in FIG. 3, a plurality of cams 25 may be attached to the shaft 23 to provide different timing sequences. A particular cam may be selected pulling or pushing the knob 31 to reposition the shaft 23 so that the desired cam 25 contacts switch 27.

While the cam illustrated in FIG. 2 is useful for selectively providing prolonged time intervals in which the ringer of the receiver is disconnected, the cam shown in FIG. 4 has a series of indentations 33 periodically disposed around its circumference. For example, the indentations 33 may be positioned at 1 hour intervals around the circumference of the cam to provide an operative period of three minutes each hour during which the connection at contact 29 is made to pass the ring control signal to the subscriber's receiver. Thus, a caller knowing the particular schedule of the cam in use would be able to call a subscriber during the operative interval. Of course, it should be recognized, that the circumferential edge of the cam be modified to provide any desired timing pattern for the do-not-disturb adapter.

Since at least some central telephone office equipment in use today monitors the current drawn by the subscriber's receiver during each "ring" to determine whether or not the receiver is operative, a resistor 34 is optionally coupled between a second contact 35 of switch 27 and the ground wire, i.e., 13G and 19G, to provide a current path for control current to ground. Without resistor 34 the ring control line, 13R and 19R, would be open-circuited during intervals when the adapter is operative, and accordingly, the central telephone office equipment would interpret this as a faulty receiver. By providing a resistive path to ground for the ring control current, as though the receiver is ringing even though, in fact, it is not. Thus, whenever the connection at contact 29 is opened by cam 25, breaking the ring control line, switch 27 is closed at contact 35 to connect resistor 34 between the ring control line 13R and the ground wire 13G.

Accordingly, there has been shown an inexpensive, simplified do-not-disturb adapter for use with a telephone receiver to block incoming ringing signals so that the subscriber is not disturbed by unwanted telephone calls. Moreover, the adpater of the present invention being completely mechanical does not use any telephone company power or power from other commercial sources. Thus, there is no danger of a hazardous voltage appearing on the telephone line.

While a particular embodiment of the present invention has been shown and described, it will be obvious to those skilled in the art that various changes and modifications can be made without departing from the invention in its broader aspects. Accordingly, the aim in the appended claims is to cover all such changes and modifications as may fall within the true spirit and scope of the invention.

I claim:

1. In a telephone system having a ring control line for conducting ringing signals to a telephone receiver, apparatus comprising:

a switch connected to the ring control line, said switch including a first and second contacts, said switch moveable between said contact position and connecting the ring control line to the ringer of said telephone receiver in said first contact position;

a resistor substantially equal to the telephone receiver ringer impedance connected between said second contact and ground, said resistor coupling the ringing signals to ground whenever said switch is placed in said second contact position;

a plurality of cams having substantially circular peripheral edges, each of said peripheral edges having at least one indentation therein;

means for rotating said cams at a predetermined rate for a selectable time interval comprising a mechanical timer, said timer including a rotatable shaft coupled to said timer, said cams being mounted on said rotatable shaft; and means for moving said rotatable shaft longitudinally to selectively engage one of said cams along said peripheral edge with said switch;

said cam opening and closing said switch between said first and second contact positions as said peripheral edge of said selected cam moves past said switch.

* * * * *